United States Patent
Schiffer

(10) Patent No.: US 6,871,063 B1
(45) Date of Patent: Mar. 22, 2005

(54) METHOD AND APPARATUS FOR CONTROLLING ACCESS TO A COMPUTER SYSTEM

(75) Inventor: Jeffrey L. Schiffer, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 319 days.

(21) Appl. No.: 09/607,804

(22) Filed: Jun. 30, 2000

(51) Int. Cl.⁷ .............................................. H04M 1/66
(52) U.S. Cl. .................. 455/410; 455/419; 455/411; 455/424; 455/426.1; 455/269; 455/418; 455/420
(58) Field of Search ................................ 455/419, 411, 455/129, 269, 410, 418, 420

(56) References Cited

U.S. PATENT DOCUMENTS 6,223,029 B1 * 4/2001 Stenman et al. ............ 455/420

6,405,027 B1 * 6/2002 Bell .......................... 455/403

FOREIGN PATENT DOCUMENTS

WO    WO 00/31608    *  6/2000

* cited by examiner

Primary Examiner—Erika Gary
Assistant Examiner—David Nguyen
(74) Attorney, Agent, or Firm—David N. Tran

(57) ABSTRACT

For one embodiment, a short-range, wireless communication link, such as a Bluetooth link, is established between a mobile phone and a computer system. The mobile phone transmits an access code via the link to the computer system. The access code is generated using data stored in the subscriber identity module (SIM) in the mobile phone. Access to the computer system is granted in response to receiving the access code. In this manner, the SIM is used not only to identify the user during cellular phone calls (or other long-range, wireless communication) but also to authenticate the user and to gain access to a computer system.

16 Claims, 2 Drawing Sheets

METHOD AND APPARATUS FOR CONTROLLING ACCESS TO A COMPUTER SYSTEM

The present invention relates to computer systems and more particularly to controlling access to a computer system by granting access to a user having a device that wirelessly transmits an access code.

BACKGROUND

Computer systems, from small handheld electronic devices to medium-sized mobile and desktop systems to large servers and workstations, are becoming increasingly pervasive in our society. As such, people are becoming more reliant on computer systems to store and access information, much of which may be confidential. To maintain the confidentiality of this information, some computer systems may be voluntarily "locked" or "secured" by a user. When a computer system is locked, access to the computer system may be limited. This not only serves to maintain the confidentiality of information stored on the computer system but also deters theft of the computer system.

One way in which access to a computer system may be limited is by password-protecting the system. In a password-protected computer system, access to the system is only granted to a user that enters a proper password. One advantage to this type of protection mechanism is that the user need not carry special security devices, such as keys or cards, to gain access to the computer system. The user need only remember a password. Another advantage to this type of protection is that different levels of access may be granted according to the password entered.

Unfortunately, password-protected computer systems may not be secure. There are a number of ways to crack a password-protected computer system. For example, a thief or spy may surreptitiously observe a user when the user enters their password. Later, the thief may simply steal the computer system, confident in the knowledge that the system can be unlocked by the thief by entering the observed password. This security problem is particularly of concern to mobile computer users. Alternatively, the spy may log onto the computer system in the user's absence using the observed password. The spy may then access confidential information without the user knowing that their security has ever been compromised.

The present invention addresses this and other problems associated with the prior art.

BRIEF DESCRIPTION OF THE DRAWINGS

The present invention is illustrated by way of example and not limitation in the accompanying figures in which like references indicate similar elements and in which.

DETAILED DESCRIPTION

In accordance with an embodiment of the present invention, the subscriber identity module (SIM) in a user's mobile phone is used to gain access to a locked computer system. Initially, access to the computer system is limited. When a user with a mobile phone comes into short-range, wireless communication range of the computer system, a short-range, wireless communication link is automatically established (i.e. established without user intervention). This short-range, wireless communication link may be a Bluetooth* link. (*Trademarks and trade names are the property of their respective owners.)

For one embodiment, the computer system transmits information to the mobile phone via the wireless link to indicate that access to the computer system is limited. In response, the mobile phone transmits an access code back to the computer system via the link. This access code is generated using data stored in the SIM in the mobile phone. After the computer system verifies the access code, access to the computer system is granted in response to receiving the access code.

In this manner, the SIM is used not only to identify the user during cellular phone calls (or other long-range, wireless communication) but also to authenticate the user to the computer system. Note that for one embodiment, the user may authenticate himself or herself to the mobile phone by, for example, entering a password into the mobile phone.

A more detailed description of embodiments of the present invention, including various configurations and implementations, is provided below.

Figure 1:
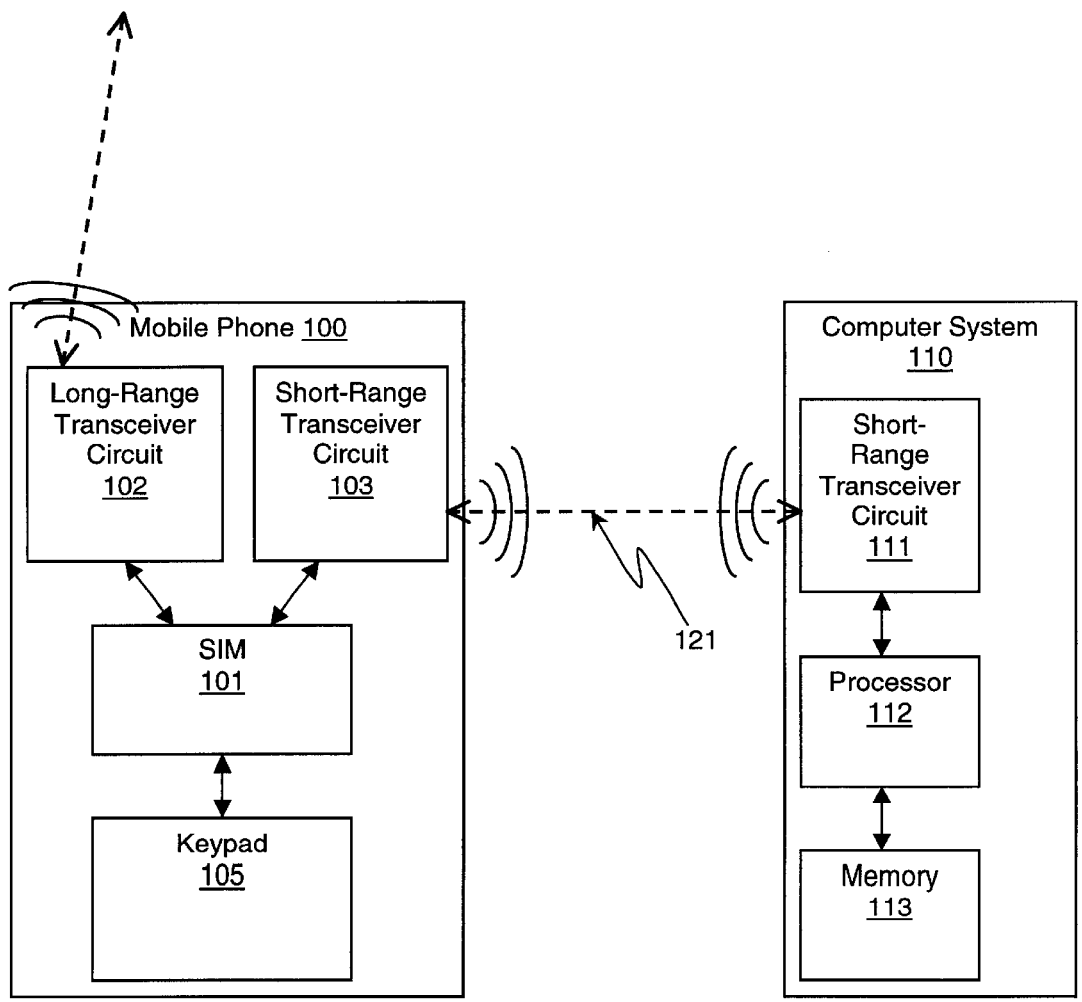
FIG. 1 is a system formed in accordance with an embodiment of the present invention.

FIG. 1 is a system formed in accordance with an embodiment of the present invention. Mobile phone 100 includes long-range transceiver circuit 102 along with short-range transceiver circuit 103, both coupled to SIM 101. Keypad 105 is also coupled to SIM 101. Computer system 110 includes short-range transceiver circuit 111, coupled to processor 112, which is coupled to memory 113.

Mobile phone 100 of FIG. 1 may be any mobile phone capable of long-range communication. For example, for one embodiment, mobile phone 100 is a cellular phone, in which case long-range transceiver circuit 102 may communicate with a cell base. For another embodiment, mobile phone 100 is a satellite phone, in which case long-range transceiver circuit 102 may communicate with a satellite or relay station.

SIM 101 of FIG. 1 includes a protected memory region having data stored therein. A protected memory region is a memory region that is not generally modifiable by typical users. Thus, important information may be securely stored in the protected memory region of SIM 101 with a low risk of being compromised. The data stored in the protected memory region of SIM 101 includes the subscriber identity number associated with the user of mobile phone 100. This subscriber identity number may be securely programmed into SIM 101 by the manufacturer or distributor of mobile phone 100.

The subscriber identity number may be unique to each mobile phone or mobile phone account holder. This number is used to uniquely identify the mobile phone subscriber when a mobile phone call (e.g. a cellular phone call) is placed via long-range transceiver circuit 102 of FIG. 1. The subscriber identity number is wirelessly communicated, along with the user's voice/data communication, via long-range transceiver circuit 102. The phone company then uses this subscriber identity number to bill the proper account holder.

As described in more detail below, in accordance with an embodiment of the present invention, data stored in the protected memory region of SIM 101 of FIG. 1, including the subscriber identity number, is used to wirelessly authenticate the user to computer system 110 by transmitting an access code. Once the access code is verified, authentication is complete, and computer system 110 grants access to the user. Thus, the data in SIM 101 that is already used by the phone company to provide subscriber identity may additionally be used to provide wireless authentication to gain access to the computer system. This reduces the need to establish an entirely new and separate protocol and standard to provide wireless authentication for a user.

In addition, because a user naturally re-charges the battery of their mobile phone as a matter of course, the battery of the mobile phone may be used to reliably enable the wireless authentication. This reduces the battery power drainage problem associated with other authentication methods, such as security badges, that require independent battery power that must be separately replaced or recharged.

Figure 2:
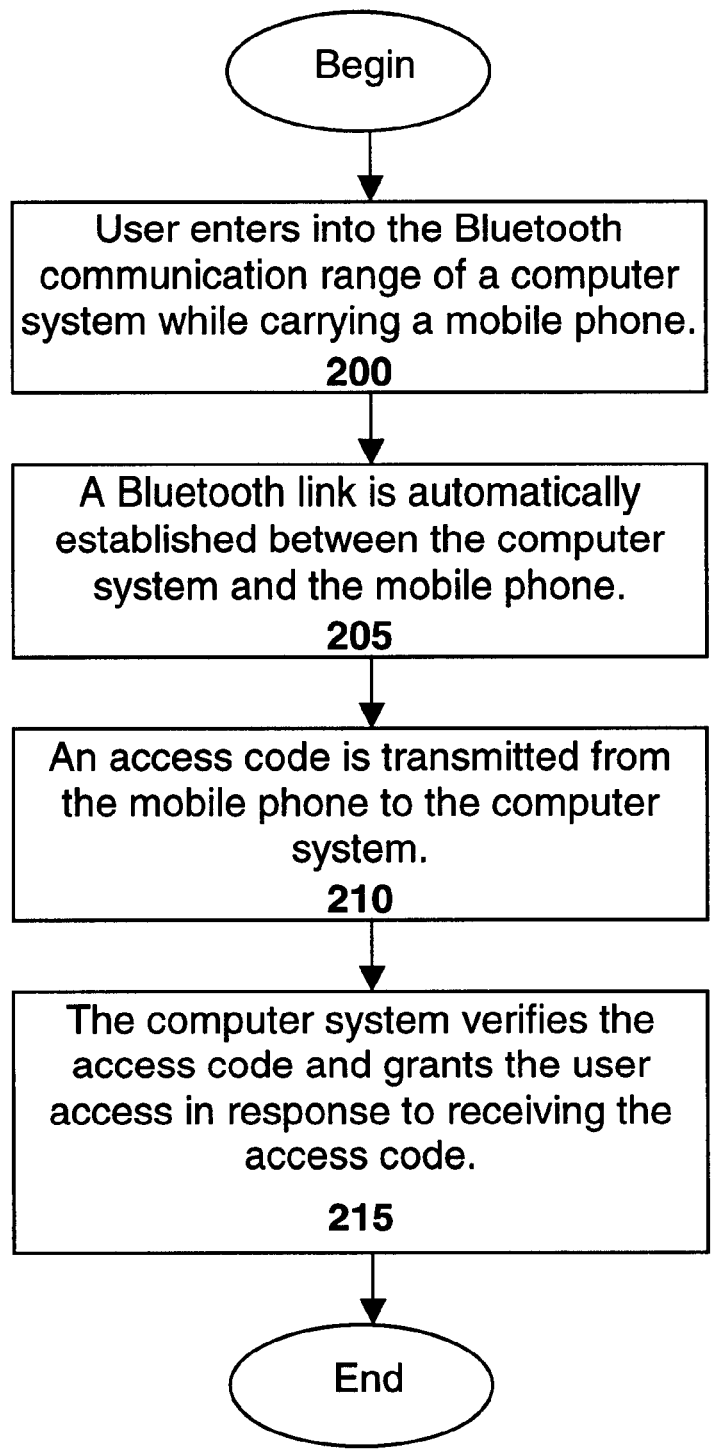
FIG. 2 is a flow chart showing a method of the present invention.

The operation of the system of FIG. 1 may be understood in light of the flow chart of FIG. 2 showing a method of the present invention. Note that a method of the present invention may be implemented by a computer system programmed to execute various steps of the method. Such a program may reside on any computer readable medium such as a magnetic disk (e.g. a hard drive or floppy disk), an optical disk (e.g. a CD or DVD), a semiconductor device (e.g. Flash, EPROM, or RAM), or carrier wave, all of which are collectively represented by memory 113 of FIG. 1.

In accordance with one embodiment of the present invention, before step 200 of FIG. 2 a user may authenticate him or herself to their mobile phone. Authentication of a user to the mobile phone may be accomplished by, for example, the user entering a password onto keypad 105 of mobile phone 100 of FIG. 1. This password may then be compared to information stored in the protected memory region of SIM 101 to verify the password. If the password is verified, mobile phone 100 may then be unlocked. Unlocking the phone enables the phone to send and receive calls via long-range transceiver circuit 102, exchange information via short-range transceiver circuit 103, and allows the user to modify phone settings via keypad 105. Alternatively, authentication of the user by the mobile phone may include performing voice recognition of the user.

After authentication between the user and the mobile phone has taken place, at step 200 of FIG. 2 the user enters into the short-range, wireless communication range of computer system 110 while carrying mobile phone 100 of FIG. 1. Consequently, a short-range, wireless communication link, 121, is established between computer system 110 and mobile phone 100, according to step 205. In accordance with one embodiment of the present invention, this short-range, wireless communication link is a Bluetooth link, and the short-range, wireless communication range is the range of the Bluetooth wireless network. (See, e.g., Bluetooth Specification, Version 1.0A, released Jul. 24, 1999.) For an alternate embodiment of the present invention, an alternate, short-range, wireless communication link is established, such as a HomeRF* link described in the Shared Wireless Access Protocol (SWAP) Specification 1.0, released Jan. 5, 1999. (*Trademarks and trade names are the property of their respective owners.)

Alternatively, other short-range, wireless communication links may be established in accordance with alternate embodiments of the present invention. It may be found advantageous for the range of the short-range, wireless communication to be less than approximately 100 feet while the range of the long-range, wireless communication may be greater than approximately 1000 feet.

For one embodiment of the present invention, the short-range, wireless communication link is established automatically, in response to bringing mobile phone 100 of FIG. 1 within the short-range, wireless communication range of computer system 110. In other words, no user intervention is required to establish the wireless communication link beyond entering the wireless communication range of the computer system while carrying the mobile phone. For an alternate embodiment, the short-range, wireless communication link is not established automatically but rather is established in response to the user pressing a button or otherwise entering information into the mobile phone or the computer system.

At step 210 of FIG. 2, an access code is transmitted from short-range transceiver circuit 103 of mobile phone 100 to short-range transceiver circuit 111 of computer system 110 via link 121 of FIG. 1. In accordance with one embodiment of the present invention, this transmission is made in response to computer system 110 transmitting information to mobile phone 100, via link 121, to indicate that access to the computer system is limited. For one embodiment, computer system 110 may specifically request an access code from mobile phone 100 via link 121. For another embodiment, mobile phone 100 may automatically transmit the access code on a regular, intermittent basis without first being prompted for the code by computer system 110.

The access code transmitted from mobile phone 100 to computer system 110 via short-range, wireless communication link 121 of FIG. 1 is generated by mobile phone 100 using data stored in SIM 101. For one embodiment of the present invention, this data includes the subscriber identity number stored in the protected memory region of SIM 101. For added security, the access code may be encrypted by mobile phone 100 before being transmitted. The algorithm used to encrypt the access code may use data stored in SIM 101. For one embodiment, the access code is all or some portion of the subscriber identity number itself. For another embodiment, the access code may be an alternate value that may be encrypted using all or some portion of the subscriber identity number as an encryption key.

Once the access code is received via link 121 by short-range transceiver circuit 111 of computer system 110 of FIG. 1, processor 112 may verify the access code at step 215 of FIG. 2. For one embodiment of the present invention, the access code may be decrypted by computer system 110 before being verified. Verification may include comparing the access code to a previously stored value to detect a match or other predetermined relationship. The previously stored value may be stored in a protected memory region of memory 113, such as the BIOS. This previously stored value may be entered by the user upon initially setting up an authentication system in accordance with the present invention. This previously stored value may include, for example, the subscriber identity number, or some portion thereof, or other security code.

Once the access code has been verified by computer system 110 of FIG. 1, the computer system grants the user access to the system at step 215 of FIG. 2. If the access code is not verified, i.e. no access code is received or the wrong access code is received, access to the computer system remains limited.

This invention has been described with reference to specific exemplary embodiments thereof. It will, however, be evident to persons having the benefit of this disclosure that various modifications and changes may be made to these embodiments without departing from the broader spirit and scope of the invention. The specification and drawings are, accordingly, to be regarded in an illustrative rather than a restrictive sense.

What is claimed is:

1. A method of accessing a computer system comprising:

authenticating a user to a mobile phone, wherein authenticating comprises receiving a password from the user, and comparing the password to information stored in a protected memory region in the mobile phone, wherein authenticating the user includes performing voice recognition of the user's voice;

when the user is authenticated, establishing a short-range, wireless communication link between the mobile phone and the computer system;

transmitting information from the computer system to the mobile phone via the wireless communication link to indicate the computer system having a limited access;

automatically transmitting an access code from the mobile phone to the computer system via the link, the access code generated using data stored in the protected memory region in the mobile phone; and granting the user further access to the computer system in response to receiving the access code.

2. The method of claim 1, wherein establishing the link is performed in response to bringing the mobile phone within a wireless communication range of the computer system.

3. The method of claim 2, wherein establishing the link is performed automatically without user intervention.

4. The method of claim 1, wherein establishing the link includes establishing a Bluetooth link.

5. The method of claim 1, wherein the access code is generated using data stored in a subscriber identity module (SIM) in the mobile phone, the data including a subscriber identity number.

6. The method of claim 5, wherein the access code is encrypted before being transmitted, and wherein the access code is verified by the computer system before further access is granted.

7. A computer-readable medium comprising a plurality of instructions readable therefrom, the instructions, when executed by a computer system, cause the computer system to perform operations comprising:

establishing a short-range, wireless communication link with a mobile device, wherein said establishing includes authenticating a user of the mobile device using voice recognition, wherein the user of the mobile device is authenticated by comparing a password from the user with data stored in a subscriber identity module (SIM) of the mobile device;

transmitting information to the mobile device, via the link, indicating that access to the computer system is limited;

receiving an access code automatically transmitted by the mobile device via the link, wherein data used to generate the access code is stored in the SIM;

and granting the user further access to the computer system in response to receiving the access code.

8. The medium of claim 7, wherein the operations further comprise verifying the access code after receiving the access code and before granting the user further access to the computer system.

9. The medium of claim 8, wherein the operations further comprise decrypting the access code after receiving the access code and before verifying the access code.

10. The medium of claim 7, wherein establishing the link includes establishing a Bluetooth link.

11. A method, comprising:

from a mobile device, authenticating a user to the mobile device, wherein authenticating comprises receiving a password from the user, and comparing the password to information stored in a protected memory region in the mobile device, wherein said authenticating includes authenticating the user of the mobile device using voice recognition;

when the user is authenticated, establishing a short-range, wireless communication link between the mobile device and a computer system;

from the computer system and via the wireless communication link, transmitting information to the mobile device indicating access to the computer system is limited;

from the mobile device, automatically transmitting an access code to the computer system via the wireless communication link; and from the computer system, verifying the access code received from the mobile device, and when the access code is verified granting the user further access to the computer system.

12. The method of claim 11, wherein the wireless communication link is established automatically when the mobile device is within a communication range of the computer system.

13. The method of claim 11, wherein the wireless communication link is established in response to a command when the mobile device is within a communication range of the computer system.

14. The method of claim 11, wherein the access to the computer system is limited before receiving the access code from the mobile device.

15. The method of claim 11, wherein the mobile device automatically transmits the access code to the computer system on an intermittent basis.

16. The method of claim 11, wherein data associated with the access code is stored in a subscriber identity module (SIM) in the mobile device.

* * * * *